(12) United States Patent
Saraf

(10) Patent No.: US 12,373,864 B2
(45) Date of Patent: *Jul. 29, 2025

(54) IN-LIST SEARCH RESULTS PAGE FOR PRICE RESEARCH

(71) Applicant: eBay Inc., San Jose, CA (US)

(72) Inventor: Bindia Saraf, Sunnyvale, CA (US)

(73) Assignee: EBAY INC., San Jose, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 18/139,787

(22) Filed: Apr. 26, 2023

(65) Prior Publication Data

US 2023/0259996 A1 Aug. 17, 2023

Related U.S. Application Data

(63) Continuation of application No. 17/833,038, filed on Jun. 6, 2022, now Pat. No. 11,669,876, which is a
(Continued)

(51) Int. Cl.
*G06Q 30/0283* (2023.01)
*G06Q 30/0601* (2023.01)

(52) U.S. Cl.
CPC ..... *G06Q 30/0283* (2013.01); *G06Q 30/0629* (2013.01); *G06Q 30/0641* (2013.01)

(58) Field of Classification Search
CPC ........... G06Q 30/0283; G06Q 30/0629; G06Q 30/0641
See application file for complete search history.

(56) References Cited

U.S. PATENT DOCUMENTS 8,700,651 B1 4/2014 Thakur
10,942,967 B1 * 3/2021 Biessmann ............ G06N 20/10
(Continued)

FOREIGN PATENT DOCUMENTS

CN 112307327 2/2021

OTHER PUBLICATIONS

Wu et al., "Mobile Shopping Site Selection: The Consumers' Viewpoint" In 37th Annual Hawaii International Conference on System Sciences, 2004. Proceedings of the, pp. 8-pp. IEEE, (Year: 2004).*

(Continued)

*Primary Examiner* — Resha Desai
*Assistant Examiner* — Patrick Kim
(74) *Attorney, Agent, or Firm* — SCHWEGMAL LUNDBERG & WOESSNER, P.A.

(57) ABSTRACT

A method of setting a listing price for an item is disclosed. One or attributes of the item are determined based on data entered into fields of a listing user interface. One or more additional items are identified based on a comparison of one or more attributes of the one or more additional items with the one or more attributes of the item. Sales information associated with the one or more additional items is determined. A range of suggested prices and at least some of the sales information is incorporated into a selection user interface region of the listing user interface. Based on a selection of a suggested price from the range of suggested prices, a preview of the listing as it would appear in a search results page with the one or more additional items is presented in the listing user interface.

20 Claims, 11 Drawing Sheets

Related U.S. Application Data continuation of application No. 16/523,413, filed on Jul. 26, 2019, now Pat. No. 11,373,221.

(56) References Cited

U.S. PATENT DOCUMENTS

| | | | |
|---|---|---|---|
| 11,373,221 B2 | 6/2022 | Saraf | |
| 11,669,876 B2 | 6/2023 | Saraf | |
| 2003/0083961 A1* | 5/2003 | Bezos | G06Q 30/02 705/26.8 |
| 2005/0131762 A1* | 6/2005 | Bharat | G06Q 30/02 705/14.66 |
| 2009/0248397 A1 | 10/2009 | Garcia et al. | |
| 2011/0082759 A1 | 4/2011 | Swinson et al. | |
| 2011/0161182 A1 | 6/2011 | Racco | |
| 2013/0204738 A1* | 8/2013 | Artun | G06Q 30/0631 705/26.7 |
| 2013/0268561 A1 | 10/2013 | Christie et al. | |
| 2014/0181756 A1 | 6/2014 | Kuo | |
| 2014/0365338 A1 | 12/2014 | Liu et al. | |
| 2016/0117371 A1 | 4/2016 | Couris et al. | |
| 2016/0267575 A1 | 9/2016 | Garcia et al. | |
| 2017/0083959 A1 | 3/2017 | Bousis et al. | |
| 2017/0323318 A1 | 11/2017 | Sarin | |
| 2020/0104868 A1 | 4/2020 | Schubert et al. | |
| 2020/0104897 A1* | 4/2020 | Oh | G06N 7/01 |
| 2020/0111141 A1 | 4/2020 | Brockbank et al. | |
| 2020/0160422 A1 | 5/2020 | Schubert et al. | |
| 2021/0027341 A1 | 1/2021 | Saraf | |
| 2022/0301025 A1 | 9/2022 | Saraf | |

OTHER PUBLICATIONS

"U.S. Appl. No. 16/523,413, Non Final Office Action mailed Aug. 27, 2021", 21 pgs.

"U.S. Appl. No. 16/523,413, Examiner Interview Summary mailed Dec. 8, 2021", 3 pgs.

"U.S. Appl. No. 16/523,413, Response filed Dec. 23, 2021 to Non Final Office Action mailed Aug. 27, 2021", 14 pgs.

"U.S. Appl. No. 16/523,413, Notice of Allowance mailed Feb. 28, 2022", 19 pgs.

"U.S. Appl. No. 17/833,038, Non Final Office Action mailed Oct. 5, 2022", 19 pgs.

"U.S. Appl. No. 17/833,038, Response filed Jan. 4, 2023 to Non Final Office Action mailed Oct. 5, 2022", 10 pgs.

"U.S. Appl. No. 17/833,038, Examiner Interview Summary mailed Jan. 9, 2023", 3 pgs.

"U.S. Appl. No. 17/833,038, Notice of Allowance mailed Jan. 27, 2023", 12 pgs.

"U.S. Appl. No. 17/833,038, Supplemental Notice of Allowability mailed Feb. 7, 2023", 10 pgs.

Dawn, Gregg G, "Auction Advisor: an agent-based online-auction decision support system", Decision Support Systems, vol. 41, Issue 2, https: doi.Org 10.1016 j.dss.2004.07.007, (2004).

* cited by examiner

FIG. 8

IN-LIST SEARCH RESULTS PAGE FOR PRICE RESEARCH

CLAIM OF PRIORITY

This Application is a Continuation of U.S. application Ser. No. 17/833,038, filed Jun. 6, 2022, which is a Continuation of U.S. application Ser. No. 16/523,413, filed Jul. 26, 2019, which applications are hereby incorporated by reference in their entireties.

TECHNICAL FIELD

The present application relates generally to the technical field of specialized computer processes for enhancing user interfaces, and, in one specific example, to enhancing a user interface of a mobile device for posting a listing of an item on a network-based publication system, the enhancing including providing a supplemental user interface or user interface element for doing price research or price selection on the item such that a user need not exit the user interface during a posting flow to access a separate user interface.

BACKGROUND

A network-based publication system, such as eBay, Amazon.com, or Craigslist, may feature listings of items (e.g., goods or services). The listings may be posted by a member of the network-based publication system (e.g., a seller) and surfaced via one or more user interfaces to other members or users of the network-based publication system (e.g., potential buyers). It can be technical challenge for a network-based publication system to provide information to a user that is relevant or useful with respect to a posting of a listing of an item without causing the corresponding user interface(s) to become cumbersome to the user, including when causing presentation of the user interface(s) on a mobile device of the user.

BRIEF DESCRIPTION OF THE DRAWINGS

Some embodiments are illustrated by way of example and not limitation in the figures of the accompanying drawings.

FIG. 8 is a listing of examples of metadata that may be used for filtering or sorting data included the preview or pricing research user interfaces described herein.

DETAILED DESCRIPTION

Figure 1:
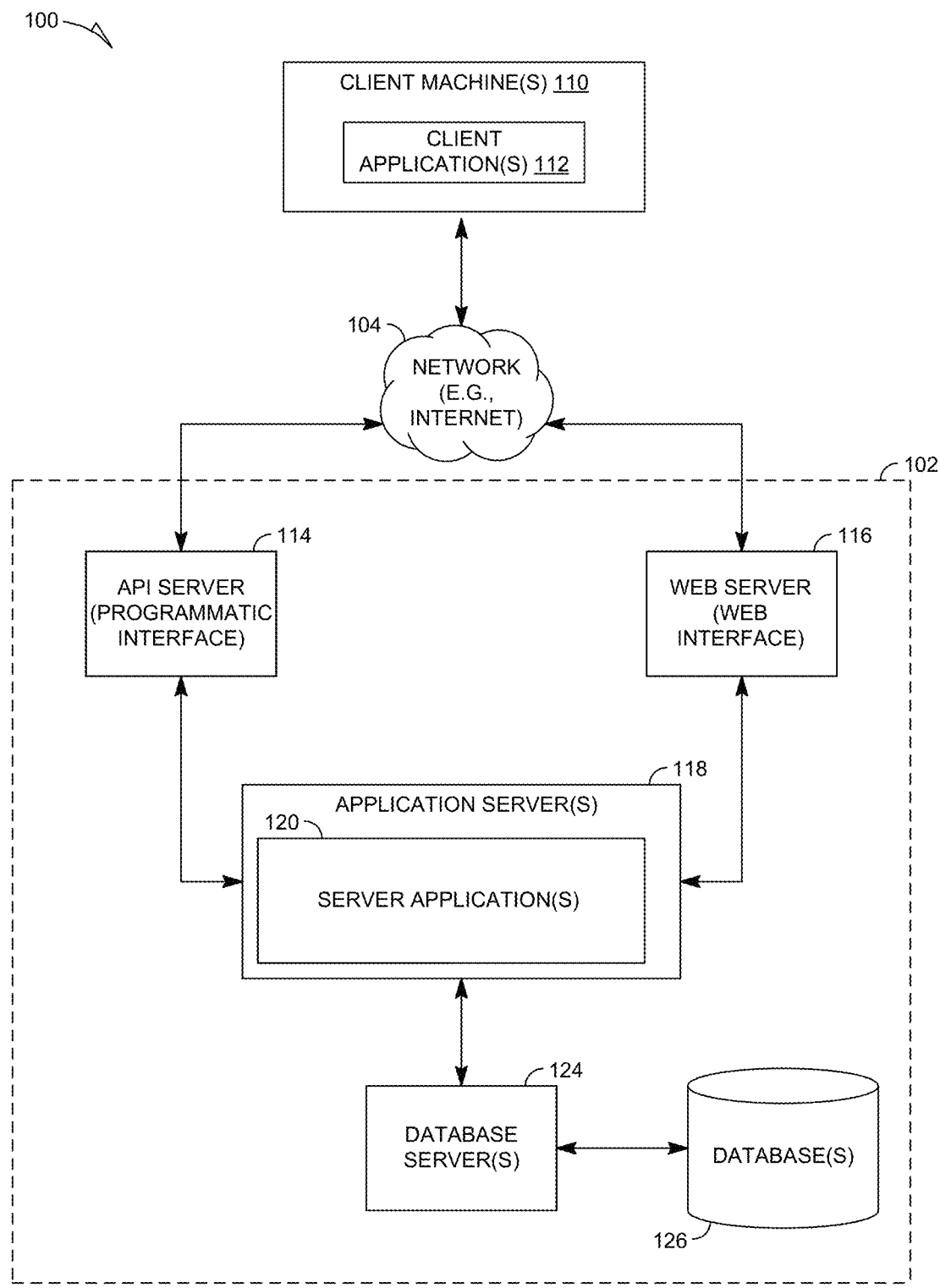
FIG. 1 is a network diagram depicting a client-server system within which various example embodiments may be deployed.

In the following description, for purposes of explanation, numerous specific details are set forth in order to provide an understanding of various embodiments of the present subject matter. It will be evident, however, to those skilled in the art that various embodiments may be practiced without these specific details.

In example embodiments, a listing user interface of a network-based publication system includes a region for selecting a suggested listing price for the item from a range of selected list prices. The listing user interface is enhanced (e.g., with one or more supplemental user interfaces or user interface elements) such that the listing user interface provides insights into the effects of choosing a particular suggested price from a range of suggested list prices. Such effects may include a time period for selling the item being increased or reduced or a listing for the item being promoted or buried within a search results page corresponding to a search for the item. The user can view these effects (or insights) from within the listing user interface so as to be able to make an informed decision as to how a selection of a particular list price is likely to impact the sale of the item. The insights may be presented in a user interface widget, such as in an interactive graph having selectable prices from the range of suggested prices. In example embodiments, information pertaining to previous sales of the same or similar items may be included in the user interface widget. In some circumstances, such as when there is no data for previously-sold items that exactly match the listing item, attributes of the items may be compared to previously-sold items and the suggested listing price for the item may be adjusted up or down based on differences between the attributes. In example embodiments, supply and demand information may be incorporated into the suggestion and presented in the user interface to allow the user to better understand the reasons for the suggestions, as well as to more easily select a particular price for an item to be listed. In this way, a user may be able to use the listing user interface enhancement to select an optimal price for the item without having to exit the listing user interface to perform additional pricing research (e.g., using a separate application or user interface).

A method of facilitating a setting of a listing price for an item is disclosed. One or attributes of the item are determined based on data entered into fields of a listing user interface. One or more additional items are identified based on a comparison of one or more attributes of the one or more additional items with the one or more attributes of the item, each of the one or more additional items having been previously sold. Sales information associated with the one or more additional items is determined. The sales information includes sales prices of the one or additional items and sales time periods of the one or more additional items. A range of suggested prices and at least some of the sales information is incorporated into a selection user interface region of the listing user interface. Based on a selection of a suggested price from the range of suggested prices, a preview of the listing as it would appear in a search results page with the one or more additional items is presented in the listing user interface.

This method and various operations disclosed herein may be implemented as a computer system having one or more modules (e.g., hardware modules or software modules) that are specially designed and incorporated into the computer system to perform this method or one or more of the operations described herein. This method and various operations disclosed herein may be embodied as instructions stored on a machine-readable medium that, when executed by a machine, cause the machine to perform the method or one or more of the various operations.

The methods and various operations disclosed herein provide specific improvements over prior art systems, including, for example, improving the speed at which a user can make an informed decision regarding pricing of items to be listed on a network-based publication system. For example, the various supplemental user interfaces or user interface elements described herein may be presented to a user during a listing flow such that the user does not have to navigate away from a user interface associated with the listing flow. Additionally, the various supplemental user interfaces or user interface elements described herein may include a limited set of data (e.g., insights), each of which may be selectable to, for example, set a listing price or other attribute for inclusion in an item-listing user interface. In this way, the speed of the user's navigation of various user interfaces associated with a network-based publication system may be improved.

Additionally, the methods and various operations disclosed herein provide specific computer resource utilization over prior art systems. For example, by combining pricing research with a listing flow (e.g., via combinations of user interfaces and user interface elements), the processing power, memory, bandwidth, and other resources of the network-based publication system may be reduced because a user is able to combine two separate tasks into one. For example, the methods and operations disclosed herein allow users to perform item listing and item research functions together, instead of by invoking separate processes (e.g., invoking additional instances of a web browser to communicate with the network-based publication system to perform the tasks separately). In this way, an overall amount of resources needed on the network-based publication system to accomplish the same tasks, especially when multiplied across many users (e.g., hundreds of thousands or millions of users).

FIG. 1 is a network diagram depicting a system 100 within which various example embodiments may be deployed. A networked system 102, in the example forms of a network-based marketplace or other publication system, provides server-side functionality, via a network 104 (e.g., the Internet or Wide Area Network (WAN)) to one or more clients machines 110. FIG. 1 illustrates client application(s) 112 on the client machines 110. Examples of client application(s) 112 may include a web browser application, such as the Internet Explorer browser developed by Microsoft Corporation of Redmond, Washington or other application supported by an operating system of the device, such as Windows, iOS or Android operating systems. Each of the client application(s) 112 may include a software application module (e.g., a plug-in, add-in, or macro) that adds a specific service or feature to a larger system.

An API server 114 and a web server 116 are coupled to, and provide programmatic and web interfaces respectively to, one or more application servers 118. The application servers 118 host one or more server application(s) 120. The application servers 118 are, in turn, shown to be coupled to one or more database servers 124 that facilitate access to one or more databases 126 or data stores, such as NoSQL or non-relational data stores.

The applications 120 may provide a number of marketplace functions and services to users that access the networked system 102. While the applications 120 are shown in FIG. 1 to form part of the networked system 102, in alternative embodiments, the various applications 120 may form part of a service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various server applications 120 could also be implemented as standalone software programs, which do not necessarily have networking capabilities. Additionally, although FIG. 1 depicts machines 110 as being coupled to a single networked system 102, it will be readily apparent to one skilled in the art that client machines 110, as well as client applications 112, may be coupled to multiple networked systems, such as payment applications associated with multiple payment processors or acquiring banks (e.g., PayPal, Visa, MasterCard, and American Express).

Web applications executing on the client machine(s) 110 may access the various applications 120 via the web interface supported by the web server 116. Similarly, native applications executing on the client machine(s) 110 may accesses the various services and functions provided by the applications 120 via the programmatic interface provided by the API server 114. An example of one of the client application(s) 112 may be a seller application (e.g., the TurboLister application developed by eBay Inc., of San Jose, California) that enables sellers to author and manage listings on the networked system 102 in an off-line manner, and to perform batch-mode communications between the client application(s) 112 and the networked system 102. Other examples of client application(s) 112 may be third-party applications. For example, the third-party applications may, utilizing information retrieved from the networked system 102, support one or more features or functions on a website hosted by the third party. The third-party website may, for example, provide one or more promotional, marketplace or payment functions that are supported by the relevant applications of the networked system 102.

Figure 2:
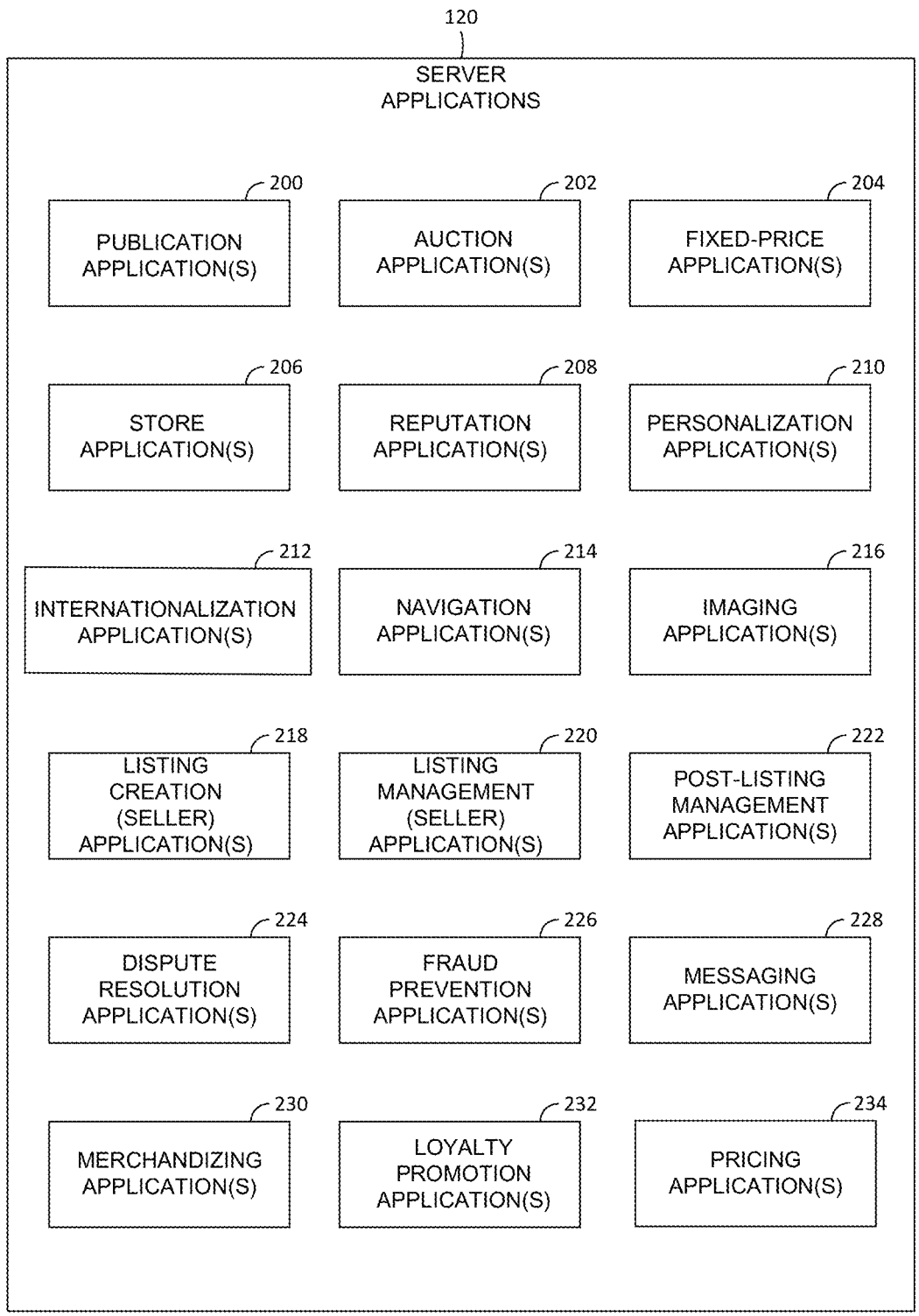
FIG. 2 is a block diagram illustrating multiple server applications that, in various example embodiments, are provided as part of the networked system of FIG. 1.

FIG. 2 is a block diagram illustrating multiple server applications 120 that, in various example embodiments, are provided as part of the networked system 102. The server applications 120 may be hosted on dedicated or shared server machines (not shown) that are communicatively coupled to enable communications between server machines. The server applications 120 themselves are communicatively coupled (e.g., via appropriate interfaces) to each other and to various data sources, so as to allow information to be passed between the server applications 120 so as to allow the server applications 120 to share and access common data. The server applications 120 may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the server applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, California) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. For instance, a version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable keyword searches of listings published via the networked system 102. A browse application may allow users to browse various category, catalogue, or inventory data structures according to which listings may be classified within the networked system 102. Various other navigation applications may be provided to supplement the search and browsing applications.

In order to make listings available via the networked system 102 as visually informing and attractive as possible, the marketplace applications 120 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular or predetermined seller has authored and/or published a large number of listings, the management of such listings may present a challenge. The listing management applications 220 provide a number of features (e.g., auto-relisting, inventory level monitors, etc.) to assist the seller in managing such listings. The listing creation application 218 and listing management applications 220 may allow sellers to manage listing in bulk (e.g., in a single operation, such as by an uploading of a file) and provide templates for sellers to manage category-specific, vendor-specific, or general-type-specific (e.g., catalog or ticket) listings. One or more post-listing management applications 222 also assist sellers with a number of activities that typically occur post-listing. For example, upon completion of an auction facilitated by one or more auction applications 202, a seller may wish to leave feedback regarding a particular or predetermined buyer. To this end, a post-listing management application 222 may provide an interface to one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of operations in an attempt to settle a dispute. In the event that the dispute cannot be settled via the guided procedures, the dispute may be escalated to a third-party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102. These messages may, for example, advise users regarding the status of listings at the networked system 102 (e.g., providing "outbid" notices to bidders during an auction process or providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotions points for each transaction established and/or concluded with a particular or predetermined seller, and may be offered a reward for which accumulated loyalty points can be redeemed.

Pricing application(s) 234 may include one or more applications for enhancing a listing user interface (e.g., for one or more of the listing creation applications 218, listing management applications 220, or post-listing management applications 222) with one or more user elements for researching, specifying, or selecting a listing price for an item, as described in more detail below.

Figure 3:
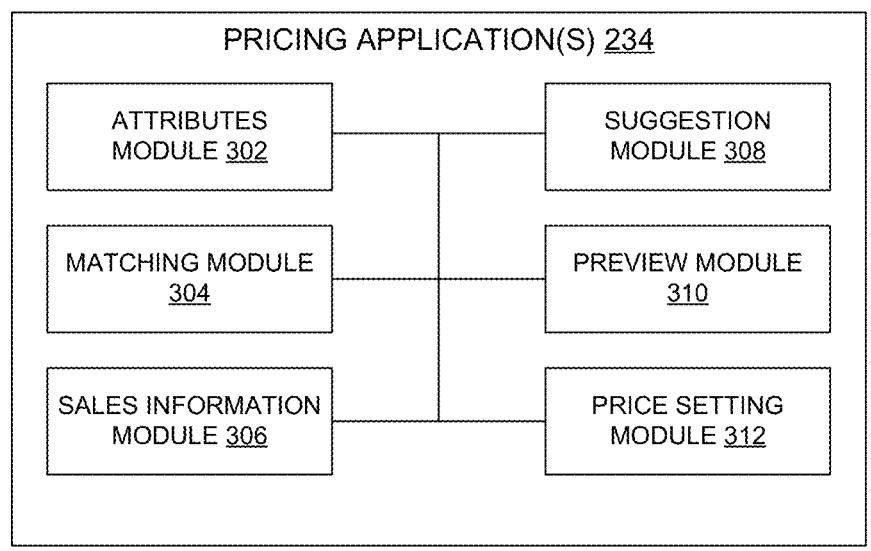
FIG. 3 is a block diagram illustrating example modules of the pricing application(s) of FIG. 2.

FIG. 3 is a block diagram illustrating example modules of the pricing application(s) 234. An attributes module 302 may be configured to determine one or more attributes of an item that a user intends to list on the network-based publication system. A matching module 304 may be configured to identify one or more additional items that correspond to the item, such as one or more items that are currently listed on the network-based publication system or one or more items that were previously-sold on the network-based publication system (e.g., within a particular time period). A sales information module 306 may be configured to determine sales information associated with the one or more additional items, such as, for previously-sold items, their listing price(s) or the amount of time the items were listed before they sold. A suggestion module 308 may be configured to provide a range of suggested prices into a selection user interface region of the listing user interface. A preview module 310 may be configured to cause a preview of a search results listing to be displayed that shows how the item would appear in the search results page with listings of the one or more additional (e.g., similar) items. The preview may highlight reasons that the search results listing for the item appears where it does relative to the additional items or reasons that the range of suggested prices is lower or higher than the additional items. For example, the preview may highlight differences in values of attributes of the item specified in the listing for the item in comparison to listings of other similar items, as explained in more detail below. A price setting module 312 may be configured to set the listing price for the item at one of the suggested listing prices (e.g., based on a selection by the user).

Figure 4:
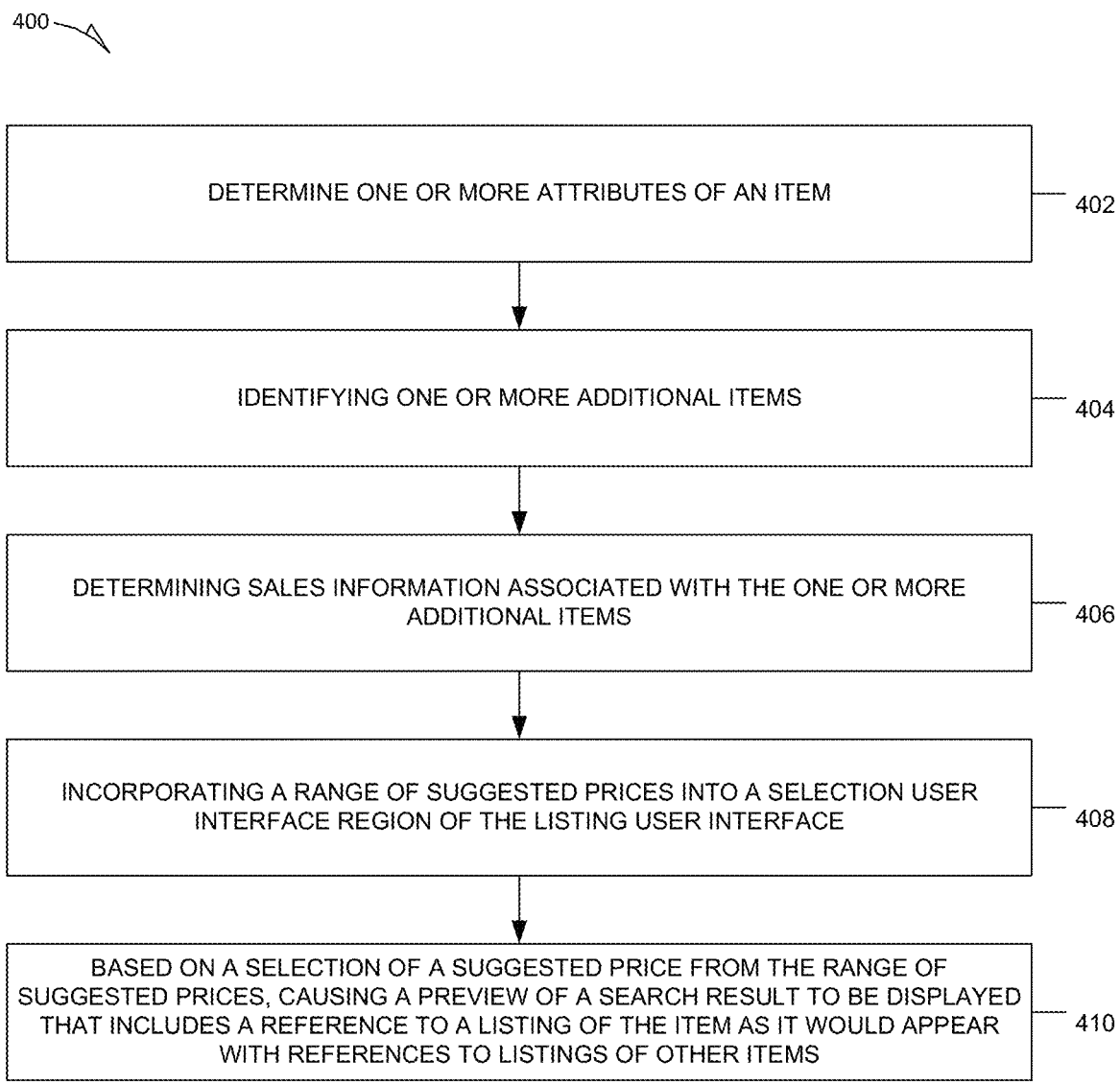
FIG. 4 is a flowchart illustrating example operations of a method of enhancing one or more listing user interfaces of a network-based publication with user interface elements to facilitate setting a listing price for an item from within the one or more listing user interfaces.

FIG. 4 is a flowchart illustrating example operations of a method 400 of enhancing one or more listing user interfaces of a network-based publication with user interface elements to facilitate setting a listing price for an item from within the one or more listing user interfaces. In various embodiments, the operations may be performed by one or more modules of the pricing application(s) 234.

At operation 402, one or more attributes of an item are determined and one or more values of the one or more attributes of the item are determined. For example, based on information provided by a user about the item in the one or more listing user interfaces, such as information entered by the user in the title, photos, description, aspects, or other fields of the one or more listing user interfaces, the item is identified. For example, the information provided by the user is compared against one or more databases of items previously listed or sold on the network-based publication system to identify additional items having a value for a strength of similarity to the item that transgresses a similarity threshold value. Additionally, one or more attributes of the item, which may include attributes not specified by the user in the one or more listing user interfaces, are identified from the one or more databases of items. For example, item information stored in the one or more databases may show that previously- or currently-listed items meeting the similarity threshold (e.g., additional items having the same type or being associated with a same category as the item being listed by the user) have been associated with particular attributes, such as color or size. Additionally, values previously-specified for the identified attributes may be determined and analyzed to determine possible sets or ranges of values for each attribute. In example embodiments, values of attributes of the specific item that is to be listed are identified directly or inferred from the information about the item that is provided by the user in the one or more listing user interfaces. For example, the value of a color attribute of the item may be inferred from the user specifying a specific color (e.g., red or blue) in the title of the item that is to be listed. As another example, the value of a size attribute of the item (e.g., size eight or size 10) may be determined from data entered by the user into a size field of the one or more listing user interfaces.

At operation 404, one or more additional items are identified. In example embodiments, the one or more additional items are a subset of previously- or currently-listed items that would be most likely to appear in a search results page corresponding to the to-be-listed item. A determination of whether an additional item would appear in the search results page may be based on keywords typically entered by users when searching for the to-be-listed item. In example embodiments, a background search may be performed on the one or more databases of previously- or currently-listed items (or a combination of the one or more databases) using the identified keywords. The additional items may then be identified based on how closely they would appear in the search results in relation to the to-be-listed item (e.g., within certain number of positions of the to-be-listed item, on the same page as the item, and so on).

At operation 406, sales information associated with the one or more additional items is determined. For example, for items of the one or more additional items that have been previously-sold, information pertaining to the sales transaction is analyzed, including sales price, time-to-sale, sale type (e.g., auction, but it now, and so on), condition of item (e.g., new or used), sale conditions (e.g., free returns, returns accepted, and so on), type of seller (e.g., authorized seller or non-authorized seller), deals or coupons (e.g., discounts provided to the buyer), and so on. In example embodiments, the sales information may also include values of attributes of the items, such as color, size, or other attributes, including attributes that may affect pricing of the to-be-listed item relative to previously-sold or currently-listed items, as explained in more detail below.

At operation 408, a range of suggested prices for the to-be-listed item are incorporated into a selection user interface region of the one or more listing user interfaces (or the range of suggested prices is incorporated into a pop-up, slide-window, or other additional user interface or user interface element). In example embodiments, insights pertaining to the range of suggested prices are also included in the user interface region or element (or in a separate, supplement user interface). In example embodiments, the insights provide information pertaining to the predicted impact of selecting one of the suggested prices (or otherwise modifying a value of an attribute of the item in the listing posting user interface) with respect to a potential sale of the to-be-listed item. In example embodiments, values of attributes of the to-be-listed item that have been identified or inferred from the information specified by the user about the item are compared against values of attributes of previously-listed and/or currently-listed items having a similarity to the to-be-listed item that transgresses a threshold similarity value. In example embodiments, differences in values of attributes between the to-be-listed item and previously-sold items may be analyzed to determine how the differences are likely to affect a transaction for the sale of the to-be-listed item. For example, based on an analysis of previously-sold items having a threshold similarity to the to-be-listed item, the impact of the identified condition of the to-be-listed item (e.g., new or used) may be incorporated into the range of suggested sales prices. In example embodiments, up to every value of up to every attribute of the to-be-listed item is analyzed to determine how it is likely to affect a transaction for the sale of the to-be-listed item, such as whether each value of each attribute is likely to increase or decreases the ultimate sales price of the to-be-listed item, the time-to-sale of the to-be-listed item, and so on.

In example embodiments, one or more differences in attributes that may be causing the seller's item to have a range of selected prices that are generally lower than other items showing at higher order in the preview may be highlighted. For example, if the seller is listing an iPhone with memory 32 GB, the preview module may point out to seller (e.g., through highlighting or other visual indication related to the value for the memory attribute of the item within the preview) that such a listing should be priced lower than the other similar listings that have more memory, say 256 GB.

Additionally, a recommendation may be provided within the preview to add one or more relevant missing attributes or keywords to the listing that may be causing the seller's item to have a range of recommended prices that are lower than other items appearing at higher order in the preview. For example, if the seller is listing an iPhone with pink as the color, AT&T as the carrier, and 32 GB as the memory, but the seller did not include carrier/unlocked information in the listing, the preview module may be configured to point out to seller that such listing should include a "Carrier" attribute with an "Unlocked" value. For example, this recommendation may be provided within the preview and based on a determination that an unlocked AT&T carrier phone is more popular with buyers (e.g., based on previous search keywords entered) than a fixed (AT&T) carrier phone or based on a determination that more interest has shown by buyers with respect to unlocked phones when they are presented interested buyers within a set of similar listings (e.g., based on monitored user behavior with respect to previous search listings). The preview may provide a visual indication of how the ranking or suggested range of prices for the item would change of the recommended attribute and value was added to the listing for the item.

At operation 410, a preview of a search result that includes the to-be-listed item is caused to be displayed in a user interface on a device of the user. In example embodiments, the search result is presented in a search results user interface as it would appear to a user who searches for the item using typical (or user-specified) keywords associated with the item. In example embodiments, the preview includes the to-be-listed item and other items matching the keywords, sorted or filtered by relevance, price, or other sorting and filtering criteria (e.g., as specified by the user). In example embodiments, the other items are currently-listed items. In other embodiments, the other items are items that have been listed in the past. In other embodiments, the other items are combinations of items that are currently-listed or have been listed in the past. In example embodiments, a determination of whether to include items listed in the past may be based on a number of items that match the keywords specified in the search query being less than a predetermined minimum number of search items. In this way, the search result may not only be representative of how the to-be-listed item would appear in the search results at or near the time of posting, but also how the to-be-listed item is likely to appear at a later time (e.g., if and when listings of additional similar items are posted). In example embodiments, the search result may be configured to show how the item would have appeared in the search result at a predetermined time in the past (e.g., excluding currently-listed items). The various options for sorting, filtering, or specifying any of the threshold values included herein, may be accessible for setting by the user from user interface elements associated with the preview (e.g., a settings icon).

In example embodiments, the preview of the search result is presented during the listing flow associated with the one or more listing posting user interfaces. For example, the preview may be presented as part of a flow in the listing posting user interface in which the user specifies a price for the item or selects a suggested price for a set of suggested prices for the item. In example embodiments, the search result is overlaid or otherwise popped up over the listing posting user interface such that the listing posting user interface is at least partially obscured. Focus of the device may switch to the search result page until the user closes the search result page to return to the listing posting user interface. In this way, the user may view how a particular selection in the listing posting user interface, such as a selection of a suggested price from a range of selected prices, is likely to affect the way in which the listing for the item will appear to users who enter a search having keywords that are associated with the item.

In example embodiments, the preview may be displayed upon a value of an attribute, such as a listing price for the item, being entered (or selected for entering) into a field of the listing posting user interface. An additional action by the user, such as clicking on or tapping the preview may cause the preview to close and/or for focus to be returned to the posting listing user interface. In example embodiments, the preview may only partially obscure the listing posting interface and/or the focus may not change to the preview, allowing the user to continue making changes to values in user interface fields of the underlying posting user interface while the preview is displayed. In example embodiments, any change to values in the fields of the posting user interface may be automatically reflected in the preview of the search results page for the item (e.g., such that the user may view the preview dynamically or in real-time while making changes to values in the user interface fields used for the posting of the listing of the item).

In example embodiments, insights are provided in the preview pertaining to comparisons between the values of the attributes of the to-be-listed item and the values of attributes of previously- or currently-listed items. For example, if the to-be-listed item has a value of "used" for the condition attribute of the item, whereas one of the other items appearing in the preview has a value of "new" for the attribute of the condition item, this difference may be highlighted in the preview (e.g., using font changes, icons, or other graphical elements to show the difference). Additionally, a recommendation of a change to a value of an attribute of the item may be provided in response to the identification of the difference between the to-be-listed item and the previously- or currently-listed items. For example, based on the identification of the difference in condition of the item, a recommendation may be provided in the preview to select a lower starting price for the item. The recommendation (e.g., how much to increase or decrease the listing price) may be based on whether or how much the change will likely improve a position of the item relative to other items included in the preview of the search results. Additionally or alternatively, the recommendation may be based on historical transaction data pertaining to the currently- or previously-listed items. In example embodiments, insights pertaining to how various changes to the listing of the item are predicted to affect aspects of the sales transaction, such as the time-to-sale of the item, are also included in the preview, as described in more detail below.

Figure 5:
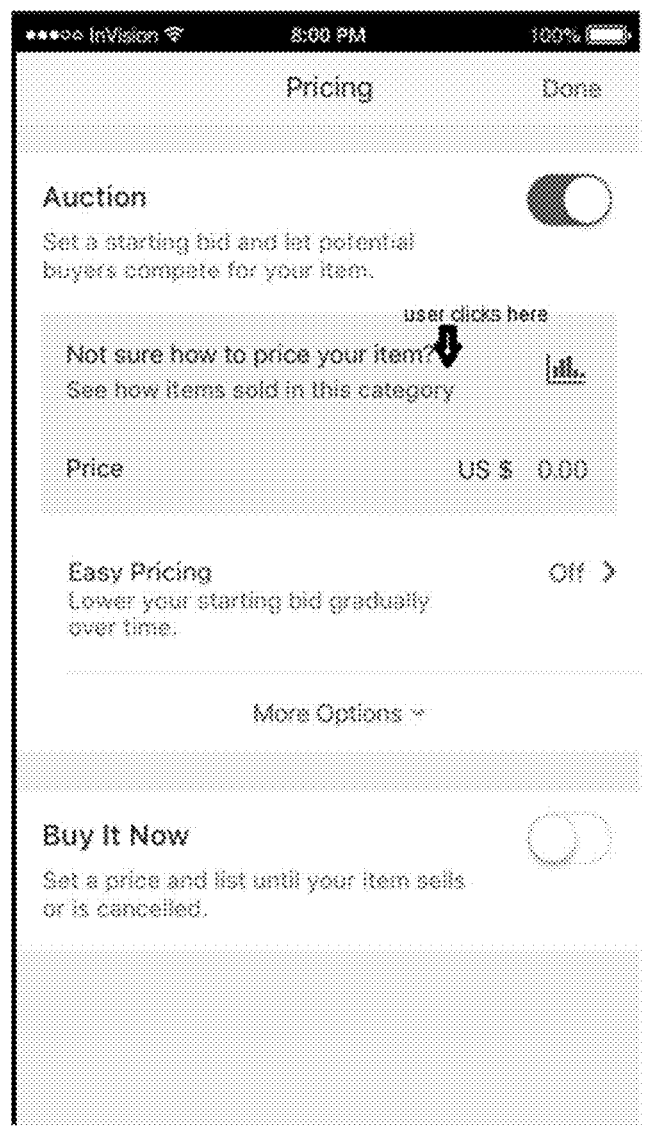
FIG. 5 is a screenshot of an example listing posting user interface.

FIG. 5 is a screenshot of an example listing posting user interface. As depicted, the listing flow of the listing posting user interface includes, among other things, specifying a type of sale to associate with listing (e.g., auction or non-auction), specifying a price for the item, specifying whether to enable an "easy pricing" feature, and specifying whether to enable a "Buy It Now" feature. As part of the listing flow, the user may activate an activatable user interface element (e.g., a link, icon, or other graphical element) to invoke an additional user interface or user interface element that provides help in setting an initial price for the item.

Figure 6:
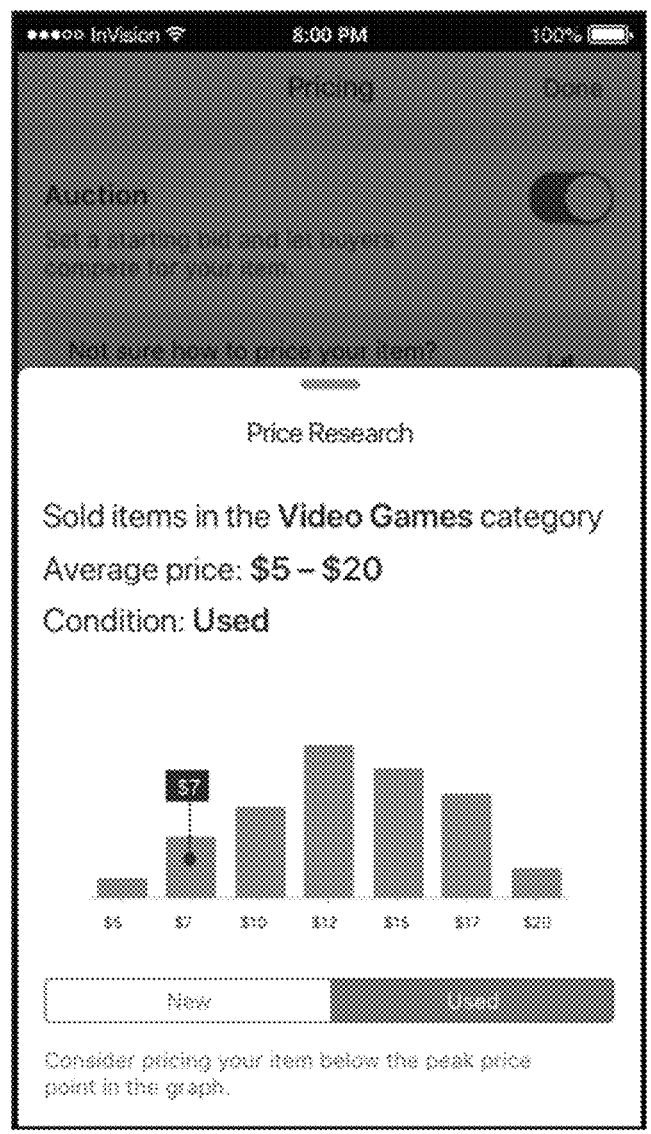
FIG. 6 is a screenshot of an example pricing research user interface.

FIG. 6 is a screenshot of an example pricing research user interface that may, for example, be overlaid over the listing posting user interface or otherwise made accessible while the user is in the flow of posting a listing for an item. In example embodiments, the example pricing research user interface includes a dynamic summary of transaction data pertaining to similar items that have been previously sold on the network-based publication system. In the depicted example, the similar items are determined to be items in a same category as the item that is to be listed (e.g., the video games category). In example embodiments, the user may activate a selectable user interface (e.g., a "Video Games" category link) to customize the threshold of similarity that is used for the pricing research (e.g., by specifying more specific categories, keywords, ranges of values of attributes, and so on) such that greater or lesser degrees of similarity are used for the pricing research. In example embodiments, ranges of values of attributes of items having the specified degree of similarity are presented, such as average sales prices, average list prices, and so on. In example embodiments, these ranges are modified in real-time if the user specifies a different degree of similarity). In example embodiments, sales information pertaining to items having the specified degree of similarity may be viewable by selectable value and attribute combinations. For example, for the attribute "condition," selectable values in the range of "new" and "used" may be identified and presented in the user interface. These selectable value and attribute combinations may then be cross-referenced against other values and attributes, such as price. In example embodiments, the range of values for a cross-referenced attribute may be presented as selectable elements (e.g., within a bar graph, as depicted). In example embodiments, a suggested price may be provided (e.g., a price below the peak price point in the graph). In example embodiments, a selection of one of the selectable elements of the range of values for the attribute may cause the value to be selected and entered automatically into an appropriate field of the underlying listing posting user interface. Thus, for example, selecting the $7 price from the range of selectable prices in the pricing research user interface may cause the pricing research user interface to close and the $7 price to be entered into the price field of the underlying listing posting user interface.

Figure 7:
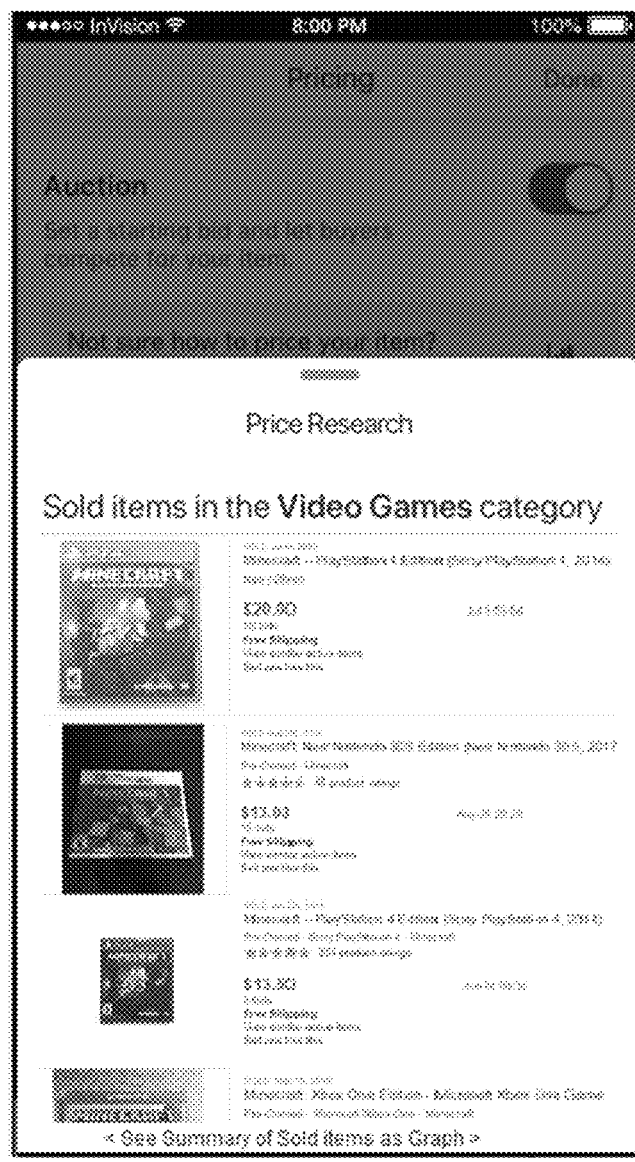
FIG. 7 is a screenshot of an example user interface for presenting a preview of a search result that includes a reference to a listing of an item that is to be listed.

FIG. 7 is a screenshot of an example user interface for presenting a preview of a search result that includes a reference to a listing of an item that is to be listed. In this example, the preview search result depicts where a listing for a Minecraft product would appear in relation to other products that would likely appear in a search for the Minecraft product. As explained above, the preview may be sorted or filtered by user specified criteria, such as relevance or list price, or any other criteria. Any differences between the to-be-listed item and the currently- or previously-listed items may be highlighted. Recommendations for changing values of attributes of the to-be-listed item, including the starting price for the item, may be provided (e.g., to improve a position of the reference to the item in the search results or a time-to-sale of the item). Additionally, changes to any fields of the underlying listing user interface may be reflected in the preview such that the user can view (e.g., in real-time), how the changes would affect the search result that includes a reference to the to-be-listed item.

Figure 8:
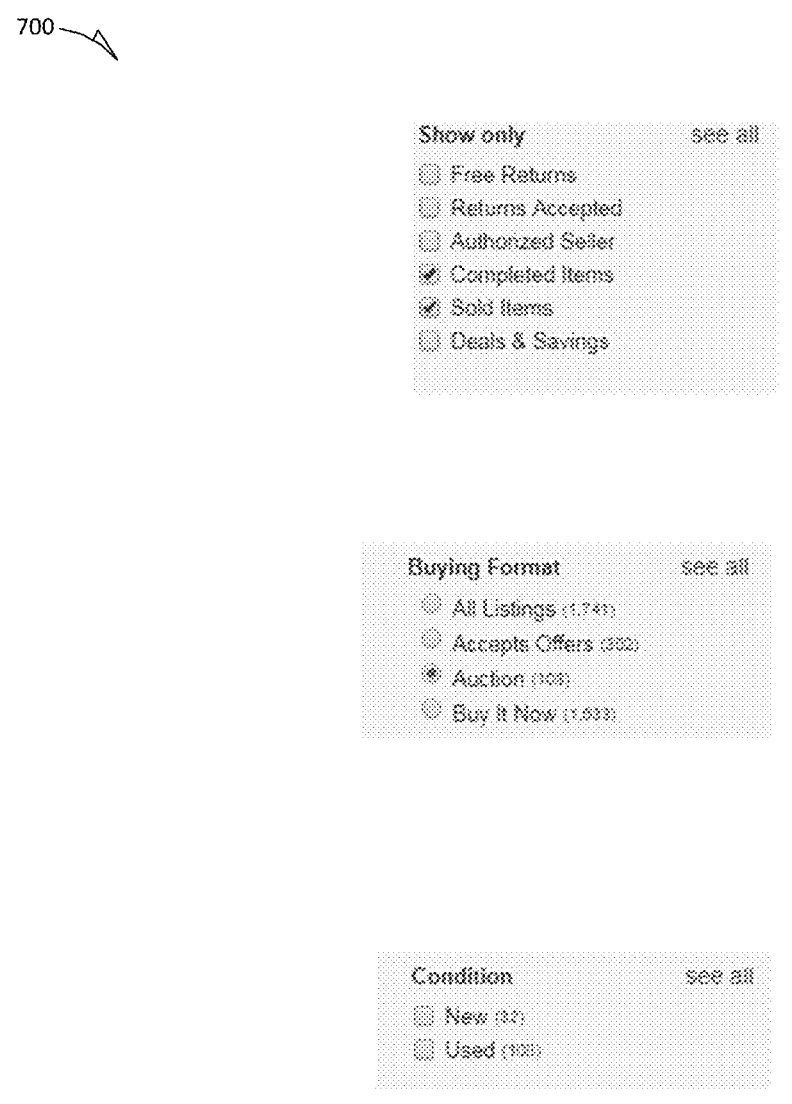

FIG. 8 is a listing of examples of metadata that may be used for filtering or sorting data included the preview or pricing research user interfaces described herein. In example embodiments, items may be filtered or sorted by flexibility of the seller (e.g., whether the seller offer free returns or whether the seller accepts returns), whether the seller is an authorized seller, whether the items are completed items, whether the items are sold items, whether the items were offered with other deals, coupons, or savings options. Additionally, the filtering and sorting options may include a buying format (e.g., auction, buy it now, or offer-acceptance options) or item condition (e.g., new or used).

Figure 9:
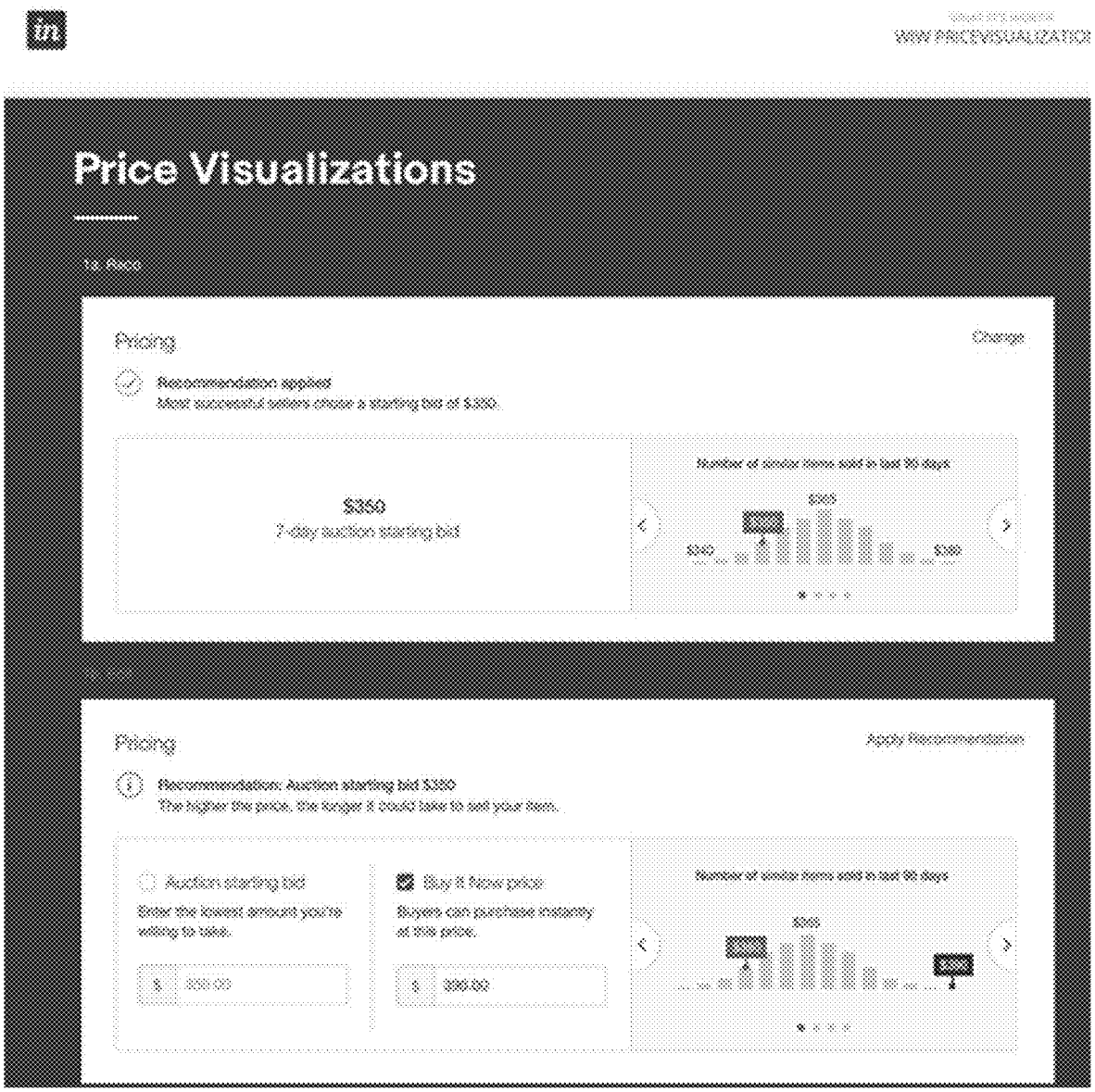
FIG. 9 is a screenshot of an example user interface for visualizing item prices.

FIG. 9 is a screenshot of an example user interface for visualizing item prices. In this example, a recommended price of $350 for a 7-day auction starting bid has been applied. As depicted, starting prices for similar items sold in the last 90 days are depicted. The "similar items" link is an example of an interactive user interface element that the user can invoke from the use interface to specify how similar items are determined. Similarly, various options pertaining to the transaction data that is depicted, such as the time period (e.g., 90 days) may be configured by the user through interactive user interface elements. Cross-referencing between particular values and other values, such as those depicted in FIG. 6, may be included and made accessible to the user (e.g., via a scrollable region of the user interface).

As another example, multiple different values of attributes of the to-be-listed item may be selected (e.g., via selection from a bar graph) and/or enabled (e.g., via check boxes) from the price visualization user interface (e.g., auction starting bid and Buy It Now price). Thus, for example, a Buy It Now Price may be selected from selectable bars of a bar graph of price to time-to-sale of similar items sold in the last 90 days. Upon selecting and/or enabling one or more of these multiple difference values, the user may be returned to the listing posting user interface to complete the posting of the listing.

Figure 10:
FIG. 10 is a screenshot of example price visualizations that may be presented to the user as insights (e.g., via the other user interfaces described herein).
Figure 10:
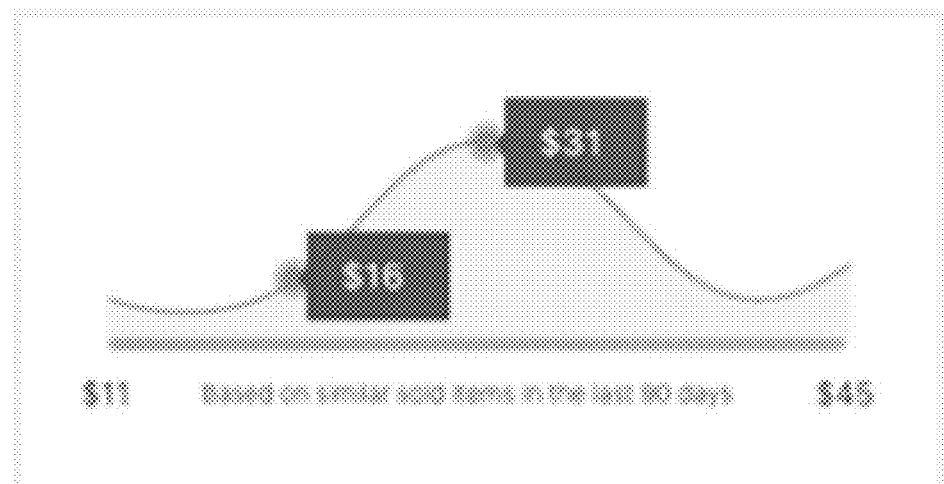
Figure 11:
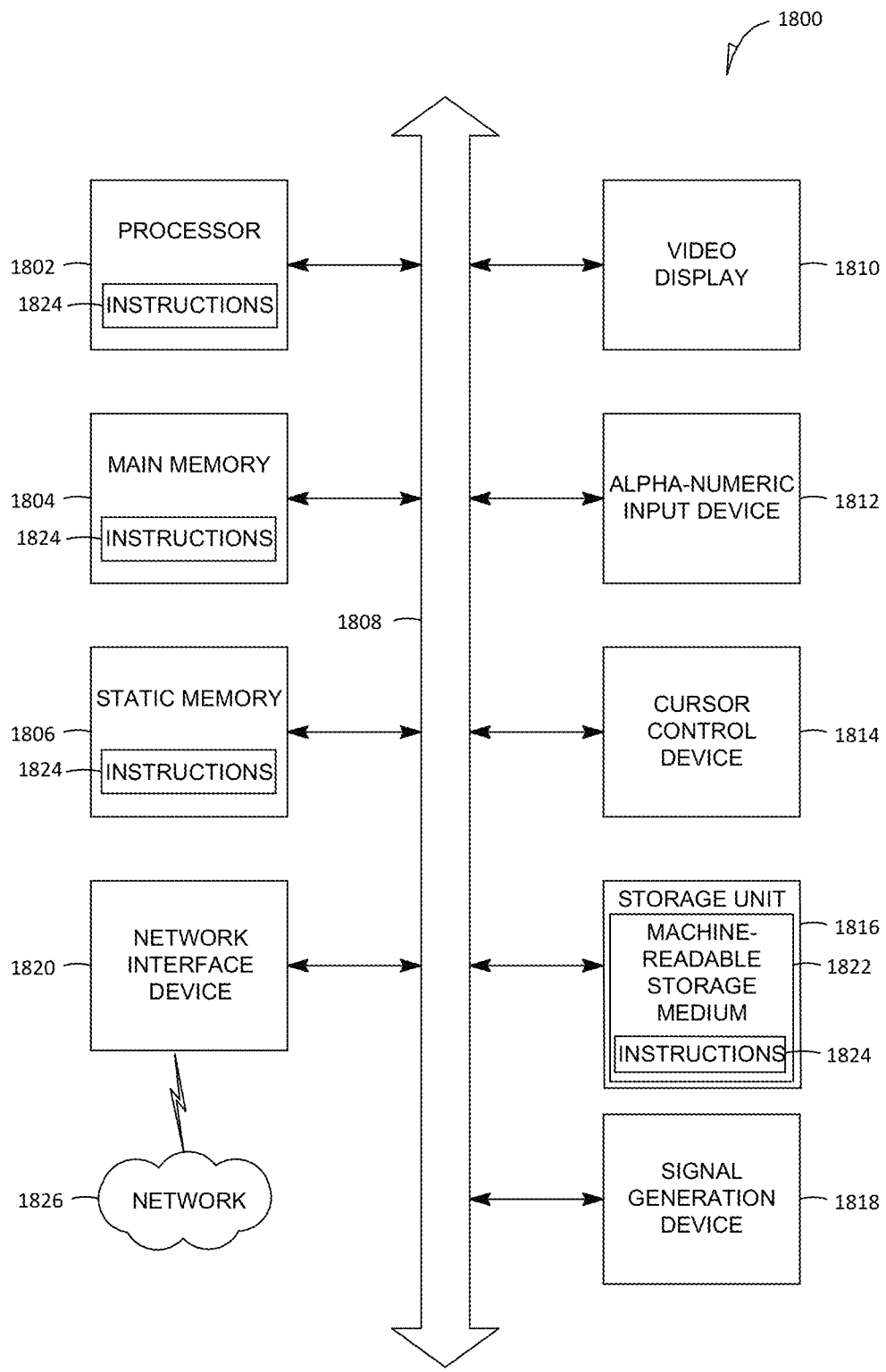
FIG. 11 is a block diagram of machine in the example form of a computer system within which instructions for causing the machine to perform any one or more of the methodologies discussed herein may be executed.

FIG. 10 is a screenshot of example price visualizations that may be presented to the user as insights (e.g., via the other user interfaces described herein). For example, sales prices of previously-sold items that are similar to a to-be-listed item may be presented as selectable user interface elements (e.g., within a bar graph) with one or more recommendations (e.g., indicating a good deal). From the range of values, the user may be able to use the sales information presented to determine optimal values for inserting into fields of the listing posting user interface, wherein the optimal values satisfy requirements of the user (e.g., such as requirements to balance a listing price with a time-to-sale of the item).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

FIG. 9 is a block diagram of machine in the example form of a computer system 1800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a storage unit 1816, a signal generation device 1818 (e.g., a speaker) and a network interface device 1820.

The storage unit 1816 includes a machine-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media. The instructions 1824 may also reside, completely or at least partially, within the static memory 1806.

While the machine-readable medium 1822 is shown in an example embodiment to be a single medium, the term "machine-readable medium" may include a single medium or multiple media (e.g., a centralized or distributed database, and/or associated caches and servers) that store the one or more instructions 1824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Accordingly, a "tangible machine-readable medium" may refer to a single storage apparatus or device, as well as "cloud-based" storage systems or storage networks that include multiple storage apparatus or devices. Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1826 may be one of the networks 104.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system of comprising:
at least one hardware processor; and
a non-transitory computer-readable medium storing executable instructions that, when executed, cause the at least one hardware processor to perform operations comprising:
determining one or more attributes of an item based on data entered into fields of a listing user interface; and
presenting, in the listing user interface on a mobile device, a preview of a listing of the item based on the one or more attributes of the item, the presenting the preview comprising presenting a recommendation to add an additional attribute to the listing based on the listing missing the additional attribute, the presenting of the preview of the listing is implemented within the listing user interface such that a user need not exit the listing user interface to view the preview, and the presenting of the preview of the listing occurs within a listing flow implemented by the listing user interface for listing the item for sale.

2. The system of claim 1, wherein the presenting the recommendation to add the additional attribute to the listing is further based on previous search keywords entered.

3. The system of claim 1, wherein the presenting the recommendation to add the additional attribute to the listing is further based on user behavior with respect to previous search listings.

4. The system of claim 1, wherein the operations further comprise:
presenting one or more suggestions in a selection user interface region of the listing user interface based on information associated with one or more additional items that have been previously sold.

5. The system of claim 4, wherein the operations further comprise:
identifying the one or more additional items based on a comparison of one or more attributes of the one or more additional items with the one or more attributes of the item.

6. The system of claim 4, wherein the information associated with the one or more additional items comprises sales prices of the one or more additional items and sales time periods of the one or more additional items.

7. The system of claim 4, wherein the presenting the one or more suggestions comprises presenting a graph of the sales prices and the sales times periods, the graph including bars as selectable user interface elements that represent suggested sales prices that correspond to the sales time periods.

8. The system of claim 4, wherein the one or more suggestions comprise one or more suggested prices.

9. A computer-implemented method performed by a computer system comprising a memory and at least one hardware processor, the computer-implemented method comprising:
determining one or more attributes of an item based on data entered into fields of a listing user interface; and
presenting, in the listing user interface on a mobile device, a preview of a listing of the item based on the one or more attributes of the item, the presenting the preview comprising presenting a recommendation to add an additional attribute to the listing based on the listing missing the additional attribute, the presenting of the preview of the listing is implemented within the listing user interface such that a user need not exit the listing user interface to view the preview, and the presenting of the preview of the listing occurs within a listing flow implemented by the listing user interface for listing the item for sale.

10. The computer-implemented method of claim 9, wherein the presenting the recommendation to add the additional attribute to the listing is further based on previous search keywords entered.

11. The computer-implemented method of claim 9, wherein the presenting the recommendation to add the additional attribute to the listing is further based on user behavior with respect to previous search listings.

12. The computer-implemented method of claim 9, further comprising:
presenting one or more suggestions in a selection user interface region of the listing user interface based on information associated with one or more additional items that have been previously sold.

13. The computer-implemented method of claim 12, further comprising:
identifying the one or more additional items based on a comparison of one or more attributes of the one or more additional items with the one or more attributes of the item.

14. The computer-implemented method of claim 12, wherein the information associated with the one or more additional items comprises sales prices of the one or more additional items and sales time periods of the one or more additional items.

15. The computer-implemented method of claim 12, wherein the presenting the one or more suggestions comprises presenting a graph of the sales prices and the sales times periods, the graph including bars as selectable user interface elements that represent suggested sales prices that correspond to the sales time periods.

16. The computer-implemented method of claim 12, wherein the one or more suggestions comprise one or more suggested prices.

17. A non-transitory machine-readable storage medium tangibly embodying a set of instructions that, when executed by at least one hardware processor, causes the at least one hardware processor to perform operations comprising:

determining one or more attributes of an item based on data entered into fields of a listing user interface; and presenting, in the listing user interface on a mobile device, a preview of a listing of the item based on the one or more attributes of the item, the presenting the preview comprising presenting a recommendation to add an additional attribute to the listing based on the listing missing the additional attribute, the presenting of the preview of the listing is implemented within the listing user interface such that a user need not exit the listing user interface to view the preview, and the presenting of the preview of the listing occurs within a listing flow implemented by the listing user interface for listing the item for sale.

18. The non-transitory machine-readable storage medium of claim 17, wherein the presenting the recommendation to add the additional attribute to the listing is further based on previous search keywords entered.

19. The non-transitory machine-readable storage medium of claim 17, wherein the presenting the recommendation to add the additional attribute to the listing is further based on user behavior with respect to previous search listings.

20. The non-transitory machine-readable storage medium of claim 17, wherein the operations further comprise:
presenting one or more suggestions in a selection user interface region of the listing user interface based on information associated with one or more additional items that have been previously sold.

\* \* \* \* \*